US 6,698,131 B2

(12) United States Patent
Latschaw

(10) Patent No.: US 6,698,131 B2
(45) Date of Patent: Mar. 2, 2004

(54) COLLAPSIBLE HUNTING BLIND

(75) Inventor: Ronald D. Latschaw, Grants Pass, OR (US)

(73) Assignee: Kolpin Outdoors, Inc., Fox Lake, WI (US)

( * ) Notice: Subject to any disclaimer, the term of this patent is extended or adjusted under 35 U.S.C. 154(b) by 0 days.

(21) Appl. No.: 10/186,520
(22) Filed: Jul. 1, 2002

(65) Prior Publication Data
US 2004/0000084 A1 Jan. 1, 2004

(51) Int. Cl.[7] .............................................. A01M 31/06
(52) U.S. Cl. .............................................................. 43/1
(58) Field of Search ................ 43/1; 135/901, 135/117, 905, 115; 297/184.1

(56) References Cited

U.S. PATENT DOCUMENTS

| 2,816,297 | A | * | 12/1957 | Stanley | 114/351 |
|---|---|---|---|---|---|
| 3,323,530 | A | | 6/1967 | Smith | |
| 3,622,201 | A | | 11/1971 | Radig | |
| 3,848,352 | A | | 11/1974 | Sayles | |
| 3,902,264 | A | | 9/1975 | Radig | |
| 3,936,969 | A | * | 2/1976 | Richard | 43/1 |
| 4,164,089 | A | * | 8/1979 | George | 43/1 |
| 4,483,090 | A | | 11/1984 | Carper | |
| 4,581,837 | A | * | 4/1986 | Powlus | 43/1 |
| 4,682,436 | A | * | 7/1987 | Ritson | 43/1 |
| 4,683,672 | A | * | 8/1987 | Davis | 43/1 |
| 4,723,371 | A | * | 2/1988 | Williams | 43/1 |
| 4,738,045 | A | * | 4/1988 | Cardozo | 43/1 |
| 4,751,936 | A | | 6/1988 | Zibble et al. | |
| 4,777,755 | A | * | 10/1988 | Colburn | 43/1 |
| 4,782,616 | A | * | 11/1988 | Hambleton | 43/1 |
| 5,075,999 | A | * | 12/1991 | Fredericks | 43/1 |
| 5,385,164 | A | * | 1/1995 | Sauter | 135/87 |
| 5,647,159 | A | | 7/1997 | Latschaw | |
| 5,822,906 | A | * | 10/1998 | Ward | 43/1 |
| D405,890 | S | | 2/1999 | Latschaw | |
| D408,552 | S | | 4/1999 | Latschaw | |
| 6,021,794 | A | * | 2/2000 | Guerra | 135/95 |

OTHER PUBLICATIONS

Photographs and materials relating to Avery "Finisher" blind (marketed at least as early as 2001).
Photographs and materials relating to Avery "Power Hunter" blind (marketed as least as early as 2002).
Photographs and materials relating to Ameristep "Fieldhouse" blind (marketed at least as early as 2001).
Photographs and materials to Kolpin "Eliminator" blind (marketed at least as early as 1999).
Photographs and materials relating to Underbrush "Ultimate" and "Classic" blinds (marketed at least as early as 2001).

* cited by examiner

Primary Examiner—Peter M. Poon
Assistant Examiner—Joan M. Olszewski
(74) Attorney, Agent, or Firm—Brian G. Gilpin; Godfrey & Kahn, S.C.

(57) ABSTRACT

A hunting blind allows the hunter to lie on his back in an inclined position. The hunter's head rests on a head rest. A gun rest is provided laterally across the hunter's body. A pair of flaps cover the hunter and are easily openable when the hunter brings his or her gun into a shooting position and/or moves to a sitting position. The blind is collapsible, requires no assembly in the field, and may be carried on the hunter's back like a backpack.

5 Claims, 7 Drawing Sheets

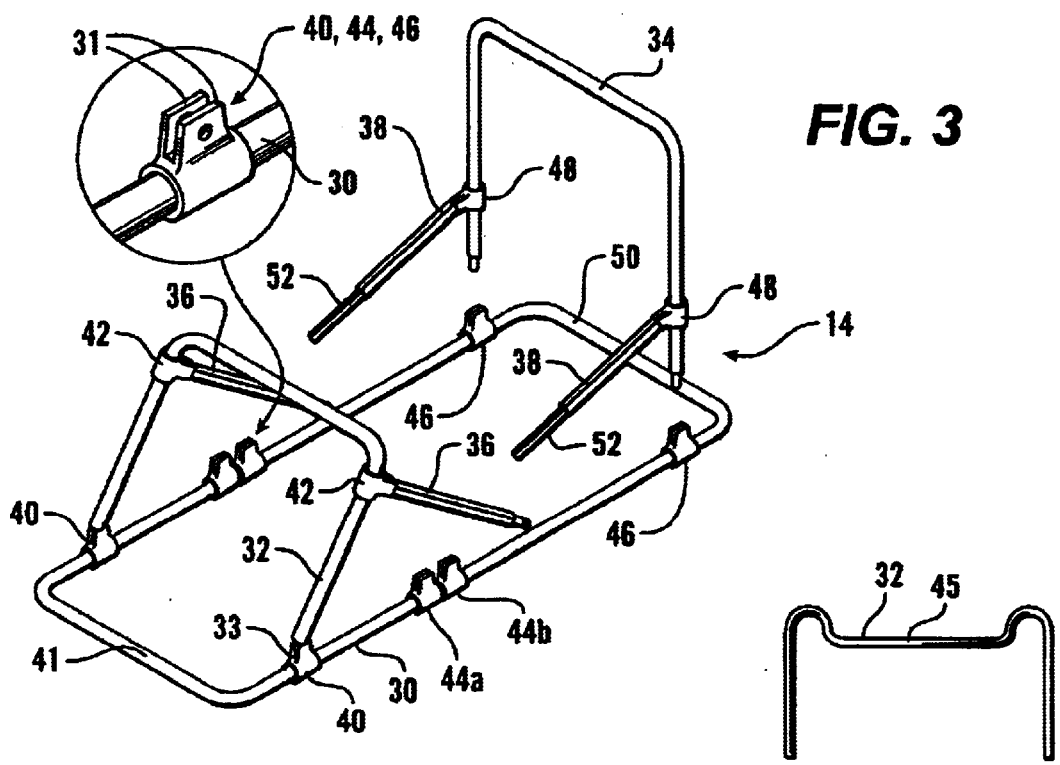
FIG. 3
FIG. 3A
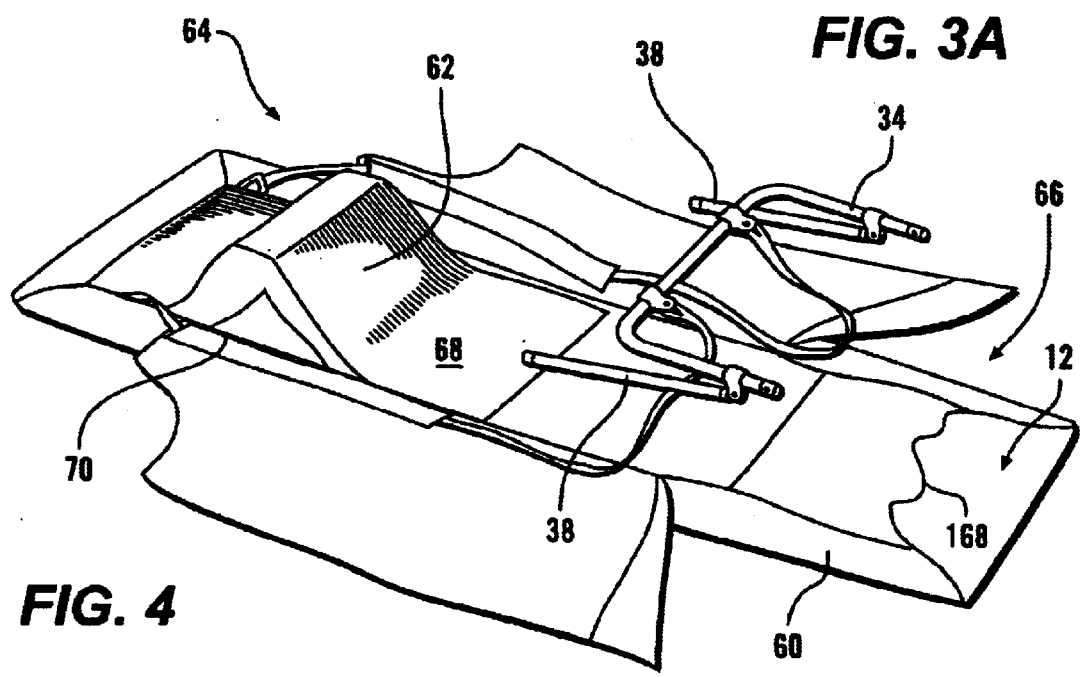
FIG. 4

COLLAPSIBLE HUNTING BLIND

FIELD OF THE INVENTION

The present invention relates generally to a portable shelters, and more particularly to portable hunting blinds that can accommodate a hunter in a supine position.

BACKGROUND OF THE INVENTION

Historically, it has been recognized by hunters that some form of concealment is advantageous when hunting game, whether it be larger mammals or relatively smaller birds and the like. While mammalian sight is often not exceptionally keen, particularly in the case of grazing animals such as deer, birds nearly universally have excellent eyesight due to their often airborne environment. Accordingly, while such relatively crude concealment as tree stands and scent means of various sorts may be effective in hunting deer and the like, far more sophisticated blinds are required when bird hunting, particularly in the case of waterfowl such as ducks and geese where typically little concealing cover is available to hunters in the typically marshy wetlands favored by such birds.

Blinds which may be set up in the field and covered with camouflage are known, with such blinds having hinged covers swingable to an open position for exposing a field of view for shooting. U.S. Pat. Nos. 3,848,352 and 3,323,530 issued to Chester M. Sayles and R. A. Smith, respectively, disclose such hunting blind structures. The hunting blinds of both of those patents incorporate top covers which may be biased to an open position with the aid of resilient elastic bands or cords. The cover of the Sayles patent is hingedly mounted on a vertical post at such a level that a hunter may sit under it. The cover opens only to a generally vertical, upright position in a direction against the wind. Thus, with the blind of Sayles oriented properly so that the hunter is facing waterfowl as they land in their normal direction against the wind, the wind would be opposing the opening of the cover. The flexible top cover of the Smith patent relies upon a trip cord for release, and utilizes elastic cords attached to the edge of the blind structure which also serves as the pivot axis for the top cover. With this arrangement, it is very questionable as to whether sufficient leverage would be exerted by the elastic cords to pull the top cover fully open, without continuing manual assistance from the hunter inside the blind.

U.S. Pat. No. 4,751,936 to Zibble et al. addresses the problem of lying on the ground. However, the blind does not provide much comfort against the elements. Further, the large swinging door may be difficult to use in windy conditions, and may attract attention.

U.S. Pat. No. 4,751,931 to Zibble et al. addresses the problem of lying on the ground. However, the blind does not provide much comfort against the elements. Further, the large swinging door may be difficult to use in windy conditions, and may attract attention.

Thus, there is a need for a portable blind which can be collapsed to a compact transport assembly, is comfortable, and is rapidly and easily erected in the field.

SUMMARY OF THE INVENTION

The hunting blind of the present invention is generally a shell that can surround a hunter in a supine position. The shell is supported by a selectively collapsible frame. The frame forms a cockpit in which a hunter can enter the blind. The cockpit is where the hunter's torso is located when the hunter is in a supine position. In one embodiment, a liner is connected to the frame for forming a wedge to support the hunter's torso in a slightly reclined supine position. To hide the hunter from prey, a pair of flaps are used to cover the cockpit. The flaps are connected to the shell with a fabric hinge. The flaps lay over the top of the open cockpit and easily open to the sides of the shell when the hunter moves from a supine position to a sitting position for shooting.

In one embodiment, the hunter's face can be covered by a mesh screen, and the bottom of the shell is lined with an insulating material. There may also be stubble straps located on the outside of the shell for attaching vegetation to the blind.

The portable blind can be transported by collapsing the frame and folding the blind. A backpack assembly is located on the bottom surface of the blind so it is easy to carry in the field.

Various other features, objects, and advantages of the invention will be apparent to those skilled in the art from the following detailed description including illustrative examples setting forth how to make and use the invention.

BRIEF DESCRIPTION OF DRAWINGS

FIG. 3 is a view of the collapsible frame used to support the blind of FIG. 1;

FIG. 3A is a detail view of an alternative embodiment of the head rest portion of the collapsible frame;

FIG. 4 is a perspective side view of the blind shown in FIG. 1 with a portion of the frame shown in a disassembled state;

DESCRIPTION OF THE PREFERRED EMBODIMENT

Figure 1:
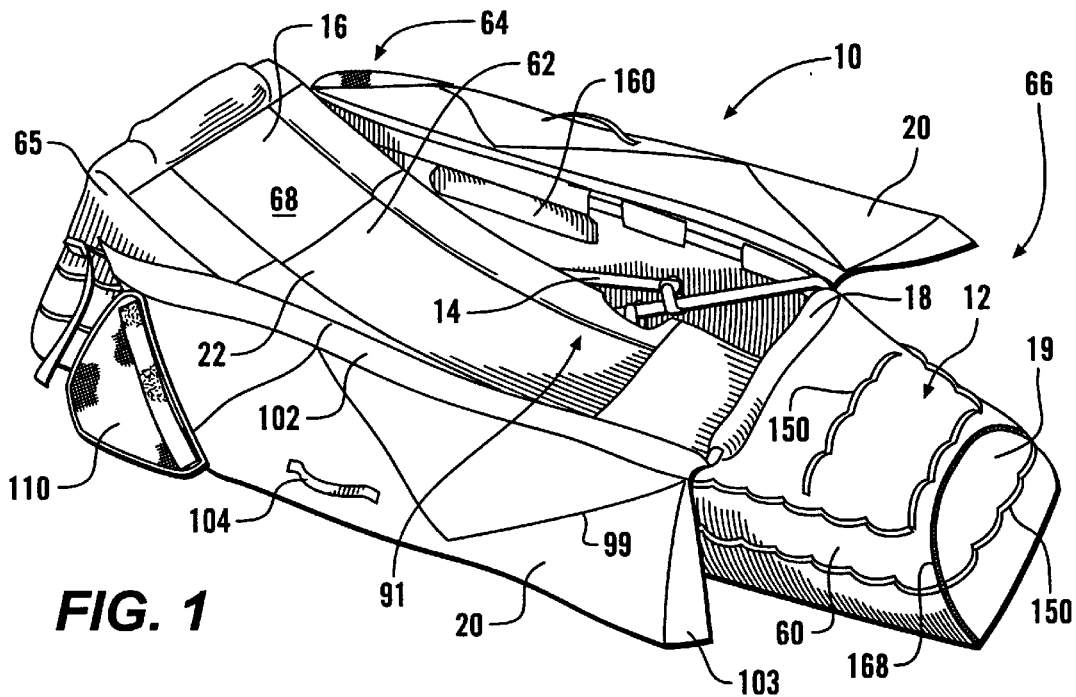
FIG. 1 is a perspective side view of the blind of one embodiment of the present invention in an open non-collapsed position.

One embodiment of the present invention is the collapsible hunting blind 10 shown in FIG. 1. The blind 10 is generally constructed from a fabric shell 12 that is supported by a collapsible frame 14. When the frame 14 is in a fully extended position as shown, the blind 10 takes on a casket-like appearance. A hunter can easily enter the blind 10 and position himself in a comfortable and practical supine position. A body support 16 is inclined upward from the floor of the blind, and a weapon support 18 is provided by frame 14. The hunter's feet and other gear may fit in the large foot box located at the end 19 located opposite the body support 16. A pair of flaps 20 are used to cover the opening 22 of blind 10 to hide the hunter. Flaps 20 can be easily opened as the hunter sits up or extends his or her arms.

The frame 14 provides the primary structural support for the shell 12. Referring to FIG. 3, frame 14 is generally constructed from certain frame components: a ground piece 30, a head rest 32, a gun rest 34, a pair of braces 36, and a pair of telescoping braces 38. Ground piece 30 is a rectangular piece wide enough to accommodate the average hunter sitting therein. Head rest 32 is an a U-shaped piece that is rotatably connected to ground piece 30 at a short distance from one end, end 41. Preferably, brackets such as nylon brackets 40 are used to make the rotatable connection. Brackets 40 wrap around the circumference of ground piece 30, and have a pair of upwardly angled fins 31 for receiving a bolt and a self-locking nut 33 extending from an end of head rest 32. Of course, other arrangements of the pieces to form the frame 14 may be used without departing from the invention.

The head rest 32 may be selectively held in an upward position with respect to ground piece 30 using braces 36. Braces 36 are rotatably connected to head rest 32 with brackets 42. (Brackets 42, 44a, 44b, 46 and 48 discussed herein may be the same type as bracket 40 or other configuration.) The opposite end of brace 36 is also rotatably connected to ground piece 30 at brackets 44a. Preferably this connection can be released with relative ease so that the head rest 32 can be selectively collapsed against ground piece 30. In one embodiment, head rest 32 has a dropped middle 45 at a top portion of the brace (see FIG. 3A). Dropped middle 45 is designed to accommodate a cushioning pad described herein.

Gun rest 34 is also a U-shaped piece that is rotatably connected to ground piece 30 at a short distance from one end, end 50. Preferably, brackets such as nylon brackets 46 are used to make the rotatable connection. The gun rest 34 is selectively held in an upward position with respect to ground piece 30 by tension in the shell 12. Braces 38 are rotatably connected to gun rest 34 using brackets 48. The opposite ends of braces 38 are also rotatably connected to ground piece 30 at brackets 44b. Each brace 38 is telescoping, and has a snap button 52 locking mechanism to keep it in an extended position. The brace can be shortened by depressing snap button 52 to allow the gun rest to fold down toward ground piece 30.

Ground piece 30, head rest 32 and gun rest 34 preferably have radiused corners so as not to unduly stress the fabric shell 12 but other shapes could be used. Frame 14 may be constructed from a tubular material such as high-tempered aluminum or other shapes and materials. The frame aluminum material has the characteristics of having a good strength to weight ratio, being noncorrosive, and being capable of supporting the hunter's torso weight at head rest 32.

Referring now to FIG. 4, shell 12 is generally constructed from an outer casing 60 and a partial inner liner 62. Preferably, the casing 60 and liner 62 are made from a tough, water proof fabric such as 900 denier polyester with a polyurethane coating. The casing 60 floor may be constructed from the same fabric or a different fabric such as an 1800 denier polyester with a waterproof coating. Of course, other suitable materials could be used to construct the casing 60 and liner 62.

As shown in FIGS. 1, 2, 4, and 5, casing 60 and liner 62 are constructed to receive frame 14 in a disassembled state. In the upper portion 64 of blind 10, liner 62 is propped up during assembly to form a wedge 65 (see FIG. 1). Wedge 65 is a "hammock" style rest where the torso of a hunter will lie against when occupying blind 10. Further, the interior volume of wedge 65, accessible by a zipper closure or the like, is useful for storing and transporting decoys, clothing, etc., when the blind is in a semi-collapsed state. In the lower portion 66 of blind 10, the liner joins together with casing 60 so that the hunter's legs and feet will lie on the ground. In one embodiment, some type of insulation such as closed cell foam is provided between the casing 60 and liner 62 in the lower portion 66 so that the hunter is less affected by cold and/or rough ground. Likewise, liner 62 located in the upper portion of blind 10 may be backed with an insulator such as closed cell foam. Because the upper portion 64 of liner 62 is separated from casing 60 to form the wedge 65, liner 62 may be backed by a secondary liner (not shown) to enclose the closed cell foam underneath the top surface 68 of this portion of liner 62. Padding 69 such as closed cell foam is connected to the top section 67 of shell 12, and wrapped around and secured to gun rest 34. The padding 69 will protect a gun barrel's ventilated rib from being scratched or damaged and helps to maintain the position of the gun.

Figure 5:
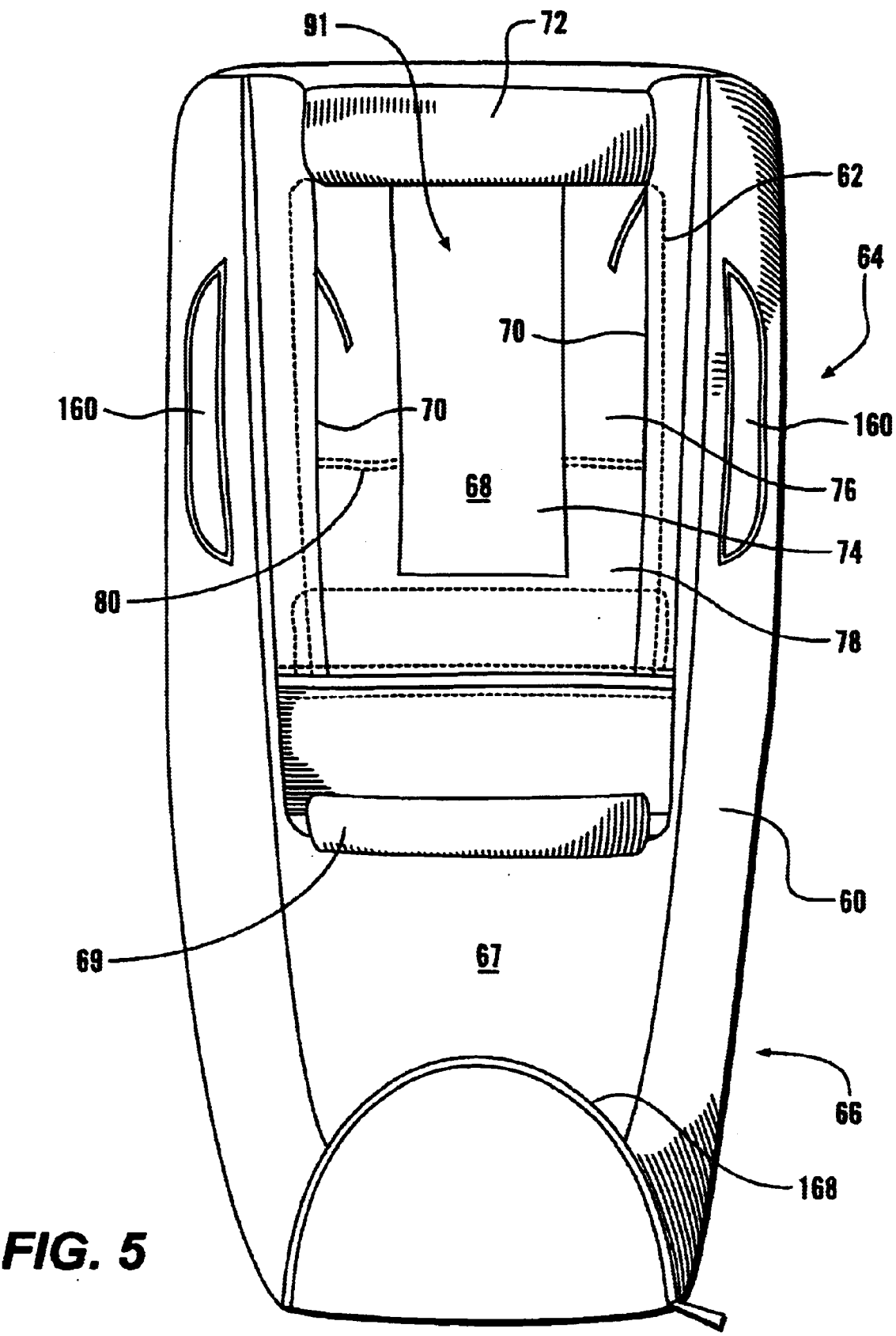
FIG. 5 is a plan view of the blind of FIG. 1, with the flaps not shown in the view for ease of viewing the interior construction.

Referring now to FIGS. 4 and 5, the structure of upper portion 64 is described more fully. In one embodiment of blind 10, the top surface 68 has the following features. First, a zipper 70 is placed near each side of blind 10. When zippers 70 are completely unzipped, the hunter can gain access to the inside of wedge 65 to assemble the frame 14, take down the head rest or to use the storage space. Second, a padded head rest 72 made from a relatively thick piece of closed-cell foam may be located at the head rest 32. This padded head rest may be encased between a liner 62 and a fabric covering sewn thereto. Third, a pocket 74 may be sewn onto top of liner for storing items such as shotguns, flags, hunting licenses, and maps. The insulation attached to the liner 62 may be between zippers 70. The insulation may be one solid piece, or may be attached in segments for desired flexibility. For example, FIG. 5 shows the insulation connected to a first segment 76 and a second segment 78. Further, there is a flexural joint 80 formed at the small area separating the segments 76,78.

Figure 6:
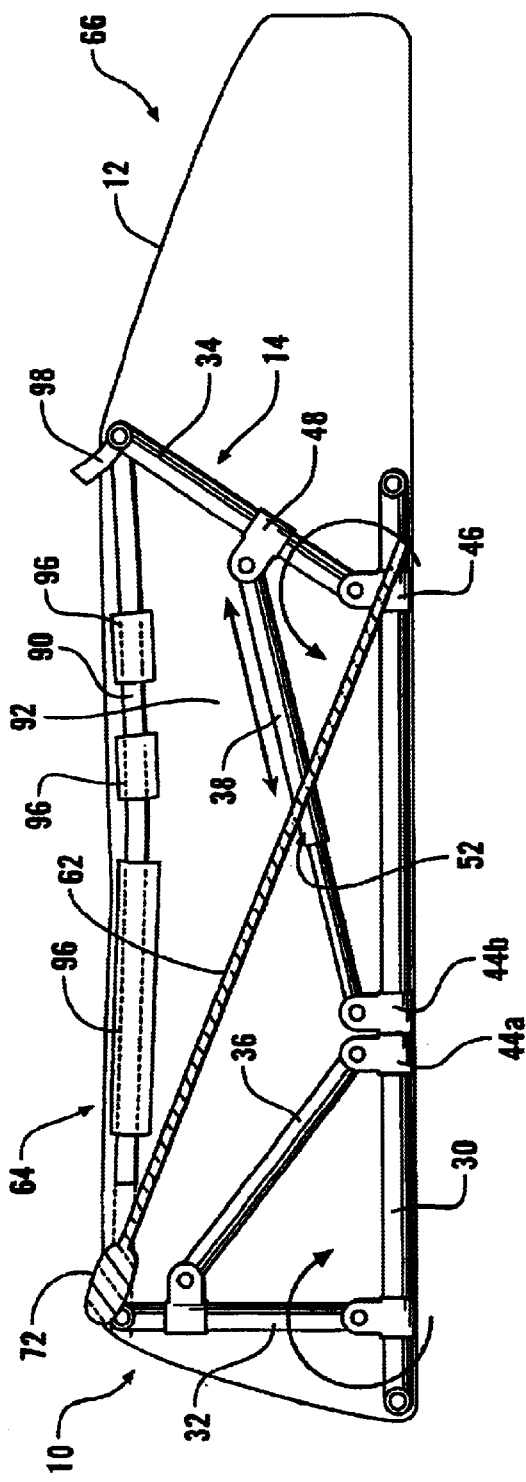
FIG. 6 is a partial side cross-sectional view of the blind of FIG. 1.
Figure 7:
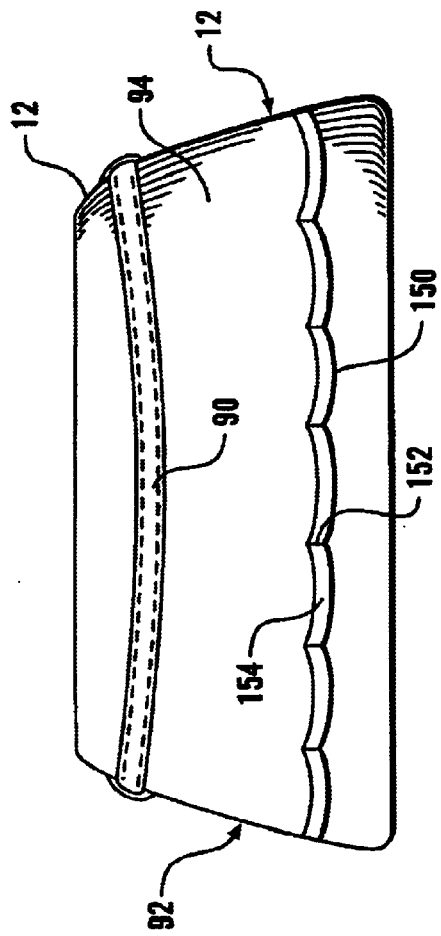
FIG. 7 is a rear elevation of the blind of FIG. 1.

Referring now to FIGS. 6 and 7, the relationship between the shell 12 and frame 14 in an assembled position is shown. Generally, a strap 90 is connected to the gun rest 34 and is pulled taught so that shell forms a cockpit 91. Strap 90 keeps the sides 92 from sagging, and helps to support gun rest 34. Strap 90, made from nylon webbing or the like, is stitched or otherwise attached to the back side 94 and extends along both sides 92 of the cockpit 91 so that it can be connected to gun rest 34. On each side 92, strap 90 is fed through sleeves 96, that may be closed with hook and loop fasteners or other closing devices such as snaps. The strap end 98 is secured to the gun rest 34 with an "H" buckle or other securing device.

When the blind 10 is assembled and the flaps are closed, most of the frame 14 cannot be viewed past liner 62. There are apertures (not shown) in liner 62 at points where braces 38 extend toward the gun rest 34. Access to the hidden portion of frame 14 may be obtained by opening zippers 70 as seen in FIG. 5.

Figure 2:
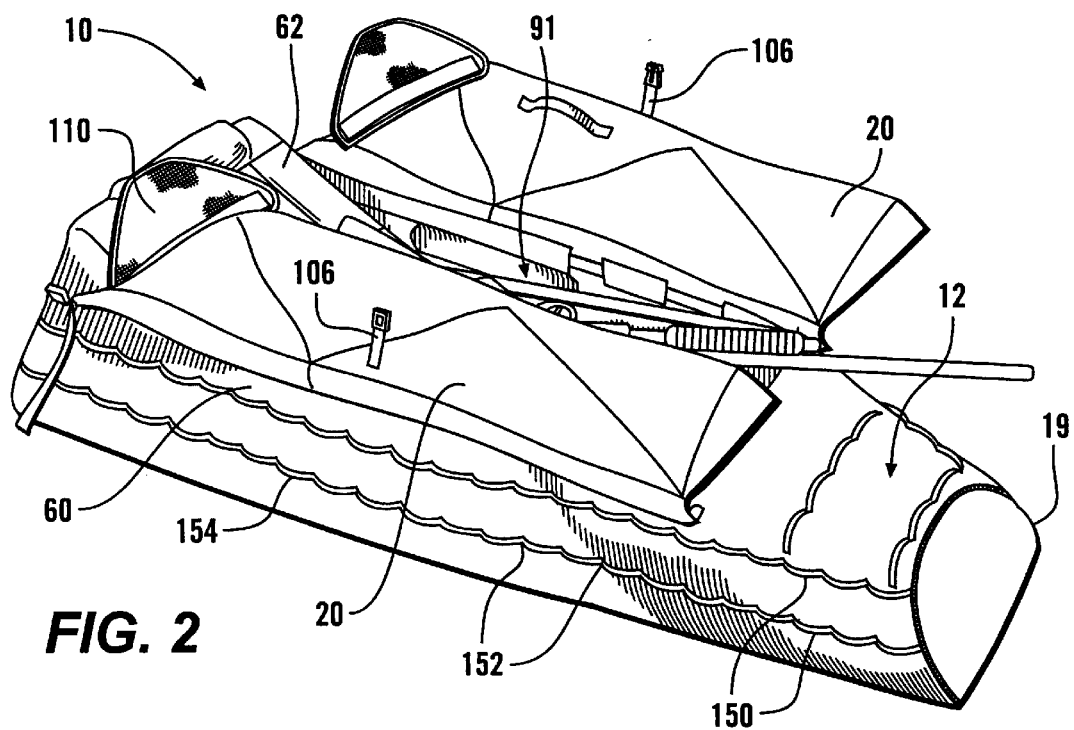
FIG. 2 is a perspective side view of the blind of FIG. 1 having one flap in a closed position.
Figure 8:
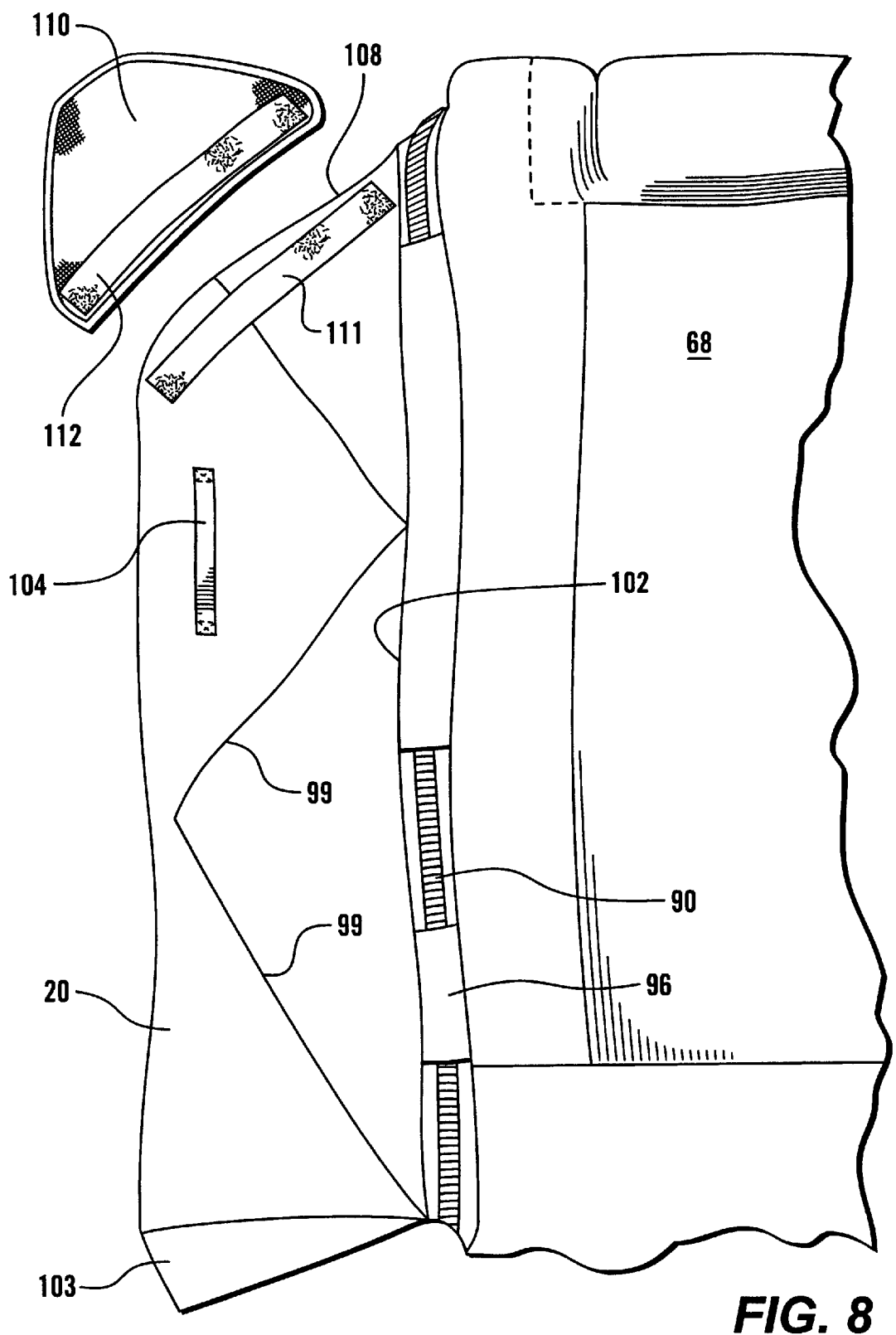
FIG. 8 is an isolated view of the one of the flaps used to cover the blind shown in FIG. 1.

The flaps 20 may be seen in FIGS. 1, 2 and 8. In one embodiment, flaps 20 are generally constructed from closed cell foam lined with nylon fabric and covered on the exterior by the same fabric as shell 12. Quilting 99 may be used to keep the foam stationary with respect to the fabric covering. The foam adds stiffness so that the flaps together form a lightweight door, and serves to insulate the hunter against cold weather. Additional stiffening members such as plastic cross or longitudinal members could be added. Each flap 20 has an elongated shape and is sized to adequately cover the cockpit 91 and hunter. Each flap 20 is connected to the shell 12 with a fabric "hinge" 102 that may run the length of the flap. A handle 104 may be attached to the inner surface of each flap 20 so that the hunter can more easily close each flap 20. The flaps 20 can be buckled closed with a quick release buckle 106 or other closing device located on the exterior surface of the flaps 20, as seen in FIG. 2. An extra length of fabric 103 may extend beyond the quilted area containing the foam. Fabric 103 can drape downward onto the shell 12 so flaps 20 look somewhat integrated with the shell, at least from a bird's eye view.

To hide the hunter's head while viewing the sky for birds, a mesh screen 110 may be used. Preferably, a screen 110 is removably attached to the top edge 108 of each flap 20. A hook and loop material 111, 112 is most useful for this as it can be configured to allow screen 110 to be attached in varied positions. Other securing mechanisms could be used.

Figure 9:
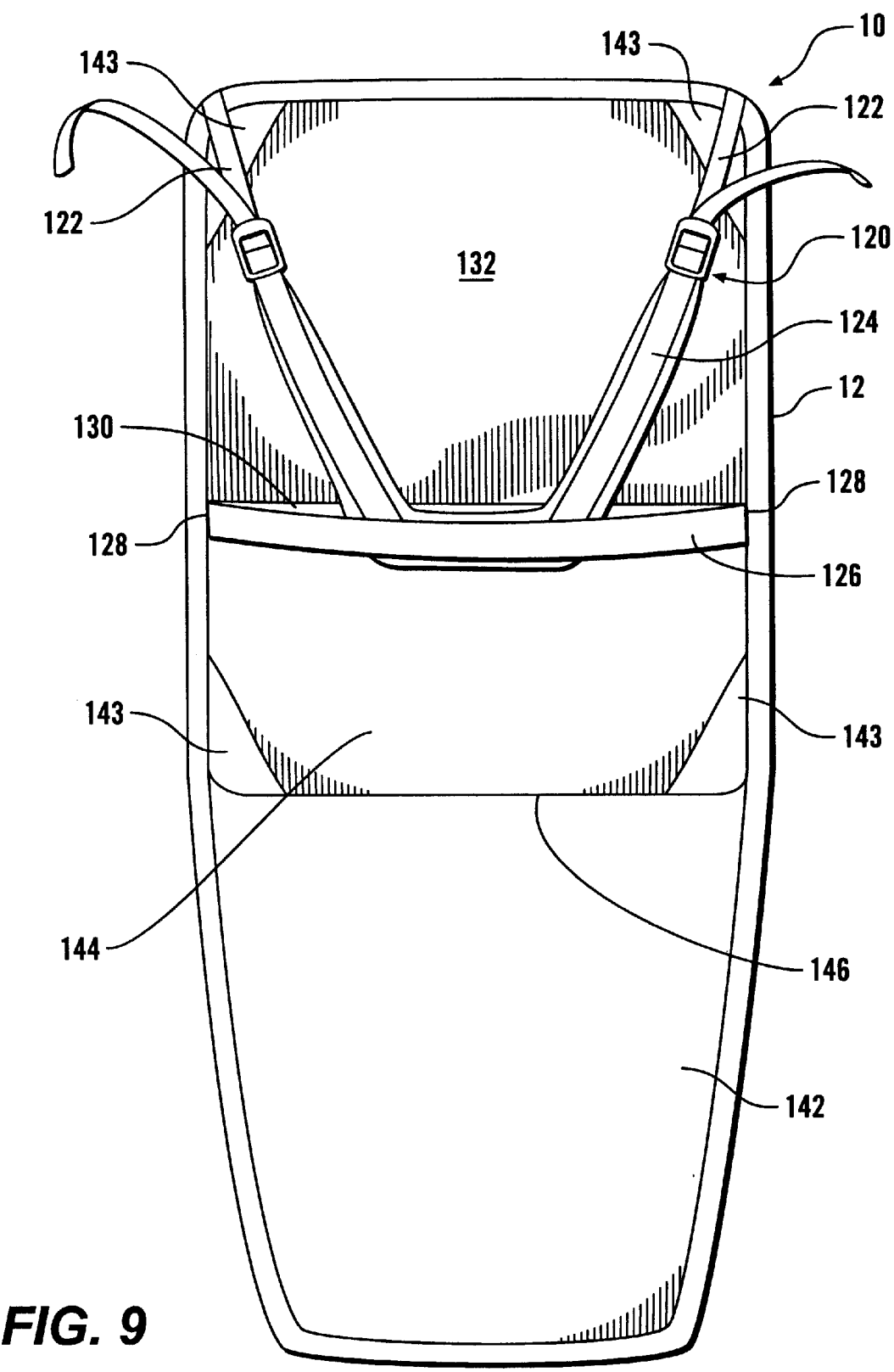
FIG. 9 is a bottom elevation of the blind of FIG. 1, showing one embodiment of the backpack assembly.

Referring now to FIG. 9, the bottom of blind 10 has a backpack assembly 120 connected thereto. The backpack assembly may be constructed from two adjustable straps 122 connected to a yoke such as U-shaped yoke 124. The bottom of yoke 124 is secured to a horizontal strap 126 that is sewn directly to the shell at each end 128. The attachment of strap 126 to shell 12 may be reinforced by an additional strap 130 sewn directly to the bottom surface 132 of shell 12. There are other backpack assemblies that could be employed for the purpose of carrying the folded blind 10 on a hunter's back, and the invention should not be interpreted as being limited to the assembly shown in FIG. 9.

Referring still to FIG. 9, foam may be used to insulate floor or bottom surface 132 of blind 10 and is installed in two separate pieces. Foam pieces are indicated by reference numbers 142 and 144. This creates a fold "line" 146 where the blind 10 can easily bend. The fold line 146 is naturally located adjacent the edge of ground piece 30, which is approximately near the mid-length point, but may extend closer to the foot box. Further, for added durability, the corners of the surface 132 may be reinforced with a fabric piece 143. This is used to prevent undue wear to the shell 12 caused by rubbing the ground piece 30 against the ground.

Referring now to FIGS. 1, 2 and 7, in one embodiment of the present invention, stubble straps 150 are applied to the exterior surface of blind 10. The purpose of the stubble straps 150 is to provide a way to attach grasses, branches or other vegetation to the exterior of the blind for increased camouflage. Stubble straps 150 may be made from continuous strips of nylon webbing or the like, stitched periodically to shell 12 at stitches 152. This will leave segments 154 for sliding the vegetation therethrough.

Referring to FIGS. 1 and 5, optional flap doors 160 may be located on each side of the cockpit so that the hunter can extend his arms out the side when lying in the blind to flag waterfowl. Preferably, the flaps are hinged at the top so that if open, rain is deflected away from the flap opening. In addition, a door may be located at end 19. A zipper 168 is preferably added for access to the foot box portion of blind 10. The zipper 168 access makes it easier to clean this area or access items stored in the foot box. Of course, other zippers or hook and loop fastened flaps could be added throughout the blind if desired.

In operation, the blind 10 is fully extended as seen in FIGS. 1 and 6. In this position, a hunter may climb into the open cockpit area and lie down so his feet are in the foot box, head is on head rest 16, and torso is against wedge 65. The hunter closes the flaps 20 so he may view the sky trough mesh screens 110. If desired, vegetation can be placed into stubble straps 150 before the hunter is positioned inside blind 10.

Figure 10:
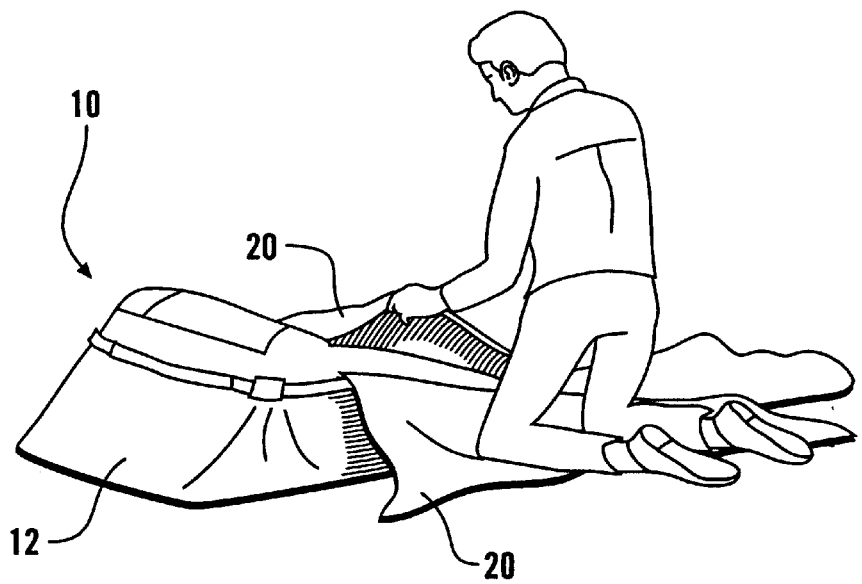
FIG. 10 is a perspective side view of the blind of FIG. 1 as it is being assembled from the collapsed position.
Figure 11:
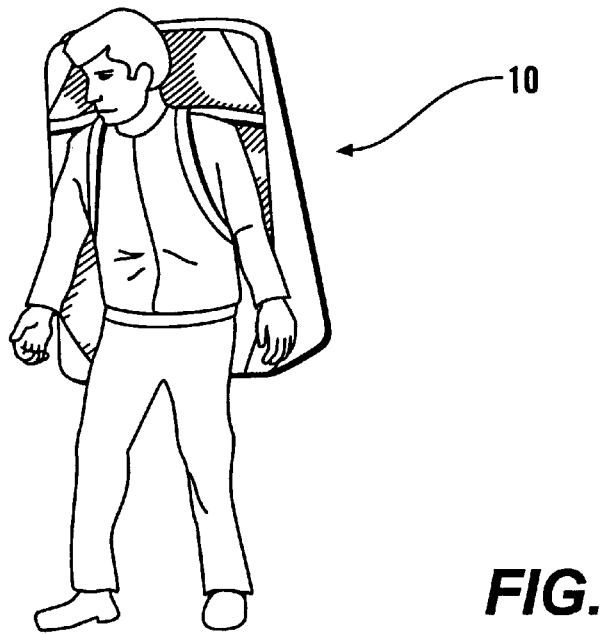
FIG. 11 is the blind of FIG. 1 shown in a collapsed position on a person's back.

Referring to FIGS. 10 and 11, to transport the blind, the hunter depresses the snap button 52 located on each telescoping brace 38, and pulls the gun rest 34 toward head rest 32. Prior to this step, the hunter may unzip a zipper 70 on surface 68 and store decoys or other items inside wedge 65. The flaps 20 are then buckled shut, and the foot box or end 19 is folded over the flaps 20 until it reaches the head rest 32. End 19 may be temporarily secured against head rest 32 by tying an elastic band (not shown) around stubble straps adjacent to the end 19 and head rest 32. Other means of securing end 19 to the head rest 32 may be used. The blind 10 can now be carried on the hunter's back by placing the yoke 124 over his or her shoulders.

While the invention has been described with reference to certain embodiments, those skilled in the art will appreciate that certain substitutions, alterations, and omissions may be made without departing from the spirit of the invention. Accordingly, the foregoing description is meant to be exemplary only and should not limit the scope of the invention set forth in the following claims.

What is claimed is:

1. A hunting blind comprising:
   a shell adapted to generally surround a hunter in a supine position;
   a selectively collapsible frame for supporting the shell, wherein the frame and shell form a cockpit, wherein the frame further includes a head piece, a ground piece, a pair of telescoping braces that are selectively connected to the ground piece, and a gun rest,
   wherein the gun rest is rotatably connected to the ground piece and connected to the pair of telescoping braces; and
   at least one flap for covering the cockpit and for hiding the hunter, the at least one flap connected to the shell so that it is openable to the sides of the shell when the hunter moves from a supine position to a sitting position.

2. A hunting blind comprising:
   a shell adapted to generally surround a hunter in a supine position;
   a selectively collapsible frame for supporting the shell, wherein the frame and shell form a cockpit;
   at least one flap for covering the cockpit and for hiding the hunter, the at least one flap connected to the shell so that it is openable when the hunter moves from a supine position to a sitting position;
   wherein the frame comprises a rectangular ground piece, a pair of telescoping braces connected to each side of the ground piece, a pair of braces also rotatably connected to each side of the ground piece, a head rest rotatably connected to the ground piece and to the pair of braces, and a gun rest rotatably connected to the ground piece and to the pair of telescoping braces.

3. The hunting blind of claim 2 further including a liner connected to the frame for forming a wedge to support the hunter in a slightly reclined supine position, wherein the wedge has a selectively accessible interior volume.

4. A collapsible frame for a hunting blind comprising:
   a ground piece having two opposite sides;
   a pair of telescoping braces connected to each side of the ground piece at a first pair of brackets;
   a pair of braces rotatably connected to each side of the ground piece at a second pair of brackets;
   a head rest connected to the ground piece and to the pair of braces; and
   a gun rest connected to the ground piece and rotatably connected to the pair of telescoping braces so at the telescoping braces retract, the gun rest rotates toward the head rest.

5. The frame of claim 4 wherein the first pair of brackets and the second pair of brackets are located adjacent to each other on the ground piece.

* * * * *